United States Patent [19]
Gorini et al.

[11] Patent Number: 5,853,159
[45] Date of Patent: Dec. 29, 1998

[54] DEVICE FOR FIXING AND SUPPORTING THE FAN MOTOR IN FORCED-AIR CIRCULATION REFRIGERATORS

[75] Inventors: Cesare Gorini, Biandronno, Italy; Eddie Teoh, Kuala Lumpur, Malaysia

[73] Assignee: Whirlpool Corporation, Benton Harbor, Mich.

[21] Appl. No.: 839,281

[22] Filed: Apr. 17, 1997

[30] Foreign Application Priority Data

Apr. 18, 1996 [IT] Italy ................................ M196U0303

[51] Int. Cl.⁶ ....................................................... F16M 3/00
[52] U.S. Cl. ............................ 248/674; 248/300; 310/91
[58] Field of Search ................................... 248/674, 300; 312/401, 263; 310/91

[56] References Cited

U.S. PATENT DOCUMENTS

| | | | |
|---|---|---|---|
| 3,746,289 | 7/1973 | Johnsen | 248/674 X |
| 4,116,410 | 9/1978 | Boyd, Jr. et al. | 310/91 X |
| 4,514,105 | 4/1985 | Adams et al. | 248/674 X |
| 4,849,667 | 7/1989 | Morrill | 248/674 X |
| 4,920,696 | 5/1990 | Mawby et al. | 248/674 X |
| 5,488,259 | 1/1996 | Cho | 310/91 |

*Primary Examiner*—Ramon O. Ramirez
*Attorney, Agent, or Firm*—Robert O. Rice; Andrea R. Powers; Joel M. Van Winkle

[57] ABSTRACT

A support arrangement for a fan motor in a refrigerator. The fan motor includes first and second axial damper elements which extend from opposite sides of the fan motor, respectively. A cavity is provided in the inner liner of the refrigerator for forming a seat to receive one of the damper elements of the fan motor. A bracket is attached to the inner liner and has a cavity forming a seat for the other damper element such that the fan motor is captured between the bracket and the inner liner. The bracket further includes end projections to which a volute casing can be attached such that the volute casing is positioned in correspondence with the fan motor.

4 Claims, 3 Drawing Sheets

DEVICE FOR FIXING AND SUPPORTING THE FAN MOTOR IN FORCED-AIR CIRCULATION REFRIGERATORS

BACKGROUND OF THE INVENTION

1. Field of the Invention

This invention relates to the fixing, for support purposes, of the motor of the forced-air circulation fan in a refrigerator of the so-called no-frost type, intended in particular for domestic use. In conventional arrangements the motor is supported via damper elements (consisting in practice of annular elastic blocks) by a pair of plastics moulded brackets joined together by ultrasonic bonding or screws at their respective mating ends. The unit formed by the said components is preassembled by the supplier of the refrigerator manufacturer and is mounted by this latter by inserting a part of it into a relatively deep compartment in the liner of the refrigerator cabinet or casing, the unit then being fixed to this liner by screws.

2. Description of the Related Art

In conventional arrangements there is a certain difficulty in mounting the volute casing which completes the fan and is positioned in correspondence with the impeller of this latter. It has also been noted that the known arrangement is not free from criticism regarding the (relatively high) noise level produced during fan operation.

SUMMARY OF THE INVENTION

An object of the present invention is to simplify this known arrangement by reducing both the costs connected with the greater use of components and the relative preassembly, and the bulk which negatively affects the insulation thickness by reducing it. A further object of the invention is to provide excellent coupling of the volute casing for the fan air while at the same time achieving appreciable noise reduction.

These and further objects which will be more apparent from the detailed description given hereinafter are attained by the device of the present invention, the characterising aspects of which are described in the accompanying claims.

BRIEF DESCRIPTION OF THE DRAWINGS

The invention will be more apparent from the detailed description thereof provided by way of example with reference to the accompanying drawing, in which.

DESCRIPTION OF THE DRAWINGS

Figure 1:
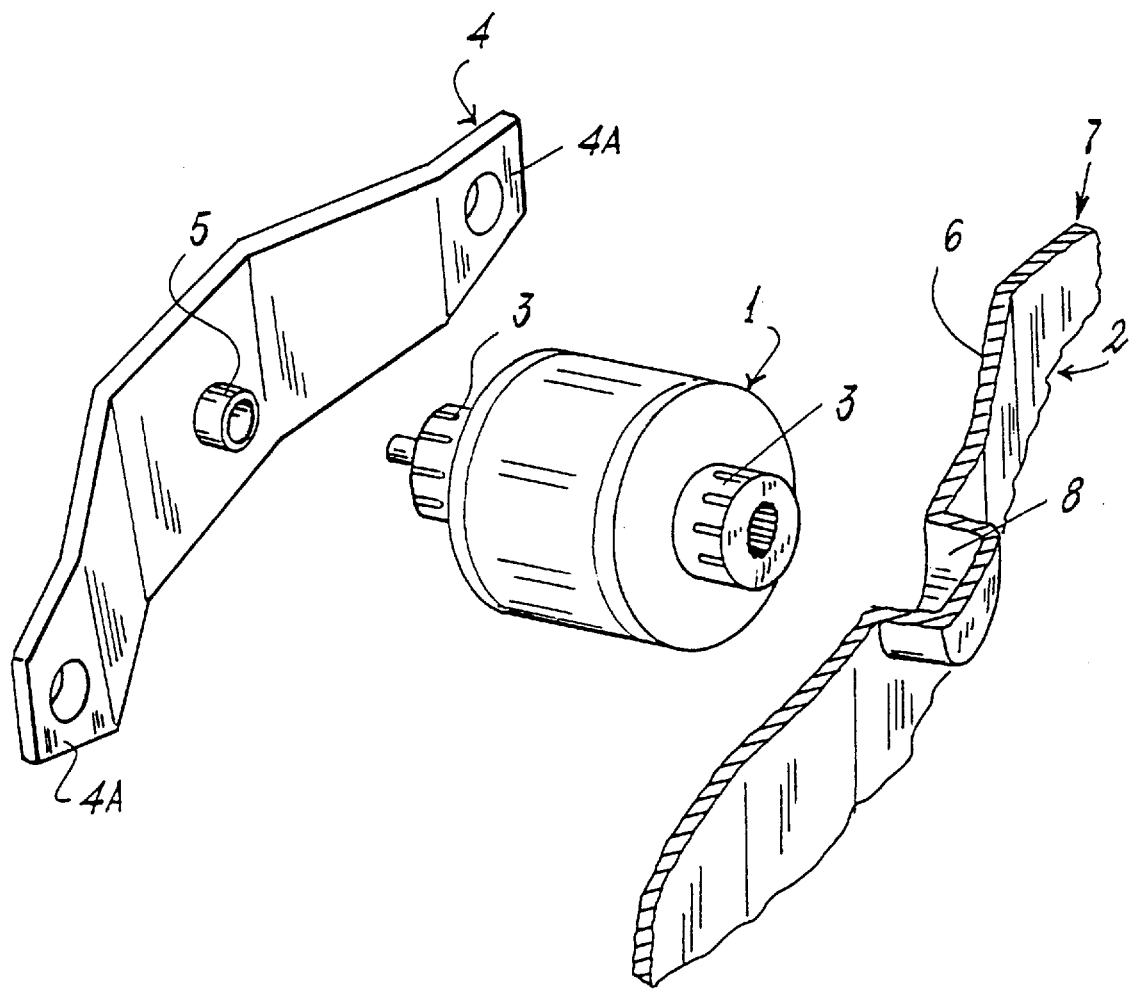
FIG. 1 exploded perspective view of the fan motor support and fixing unit in an embodiment in accordance with the teachings of the invention.
Figure 2:
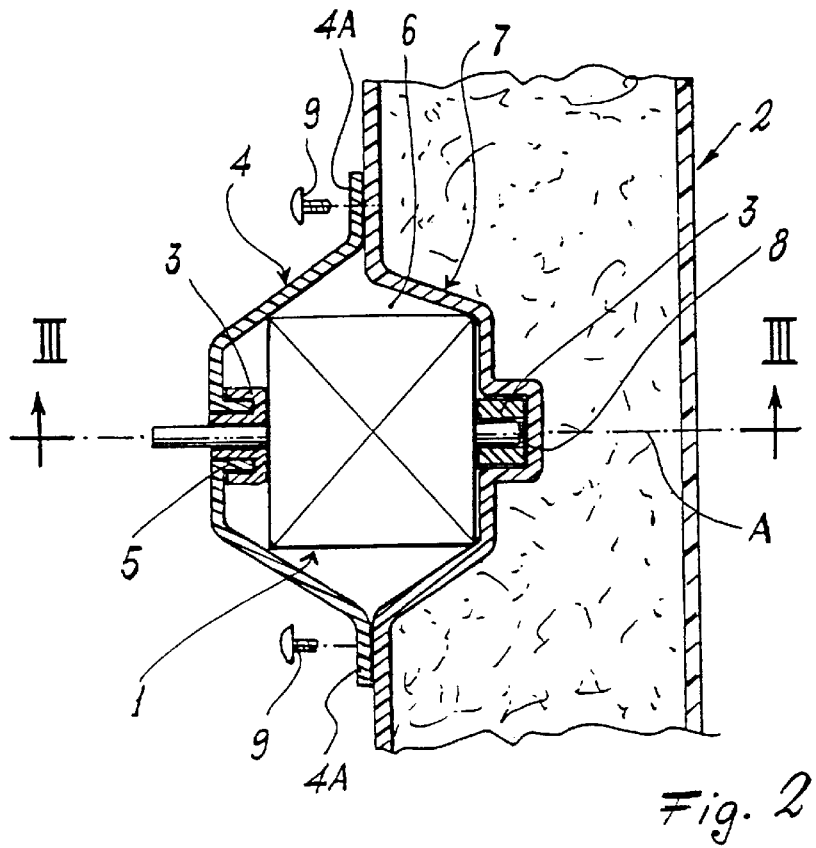
FIG. 2 a section through the unit on the line II—II of FIG. 3.
Figure 3:
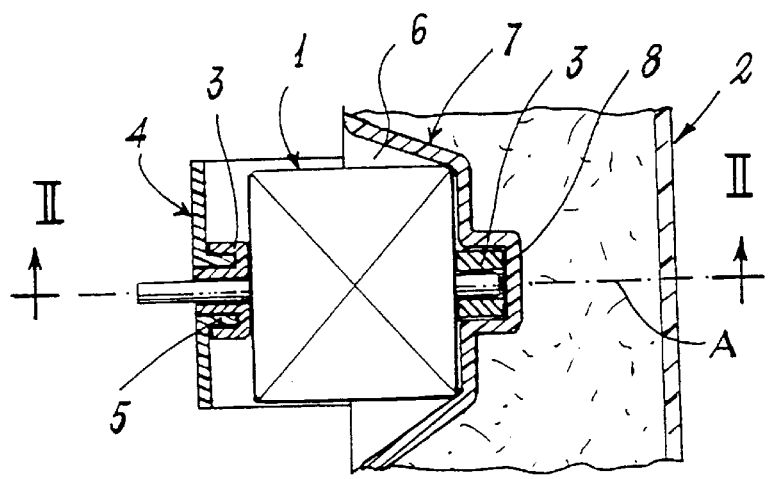
FIG. 3 a section on the line III—III of FIG. 2.

In FIGS. 1 to 3, the reference numeral 1 indicates an electric motor for operating a conventional impeller for producing forced-air circulation within a refrigerator cabinet 2 of the no-frost type.

The motor is supported in correspondence with its axial bearings (via annular rubber damper blocks 3) by a plastics-moulded bracket 4 comprising a seat 5 for one of the damper elements 3, and by a cavity 6 (directly formed during the shaping of the internal plastics liner 7 of the refrigerator cabinet), this cavity comprising a seat 8 for the other damper element 3. The bracket 4 comprises two end feet 4A to adhere to the liner 7 in proximity to its cavity 6, and fixed thereto by self-tapping screws 9.

The described arrangement has a series of advantages, in that one of the normally used brackets is eliminated, no preassembly of the unit is required and the cavity 6 has a smaller depth, thus allowing a greater thickness of thermal insulation 10 in this region (indicated by A in FIG. 2).

Figure 4:
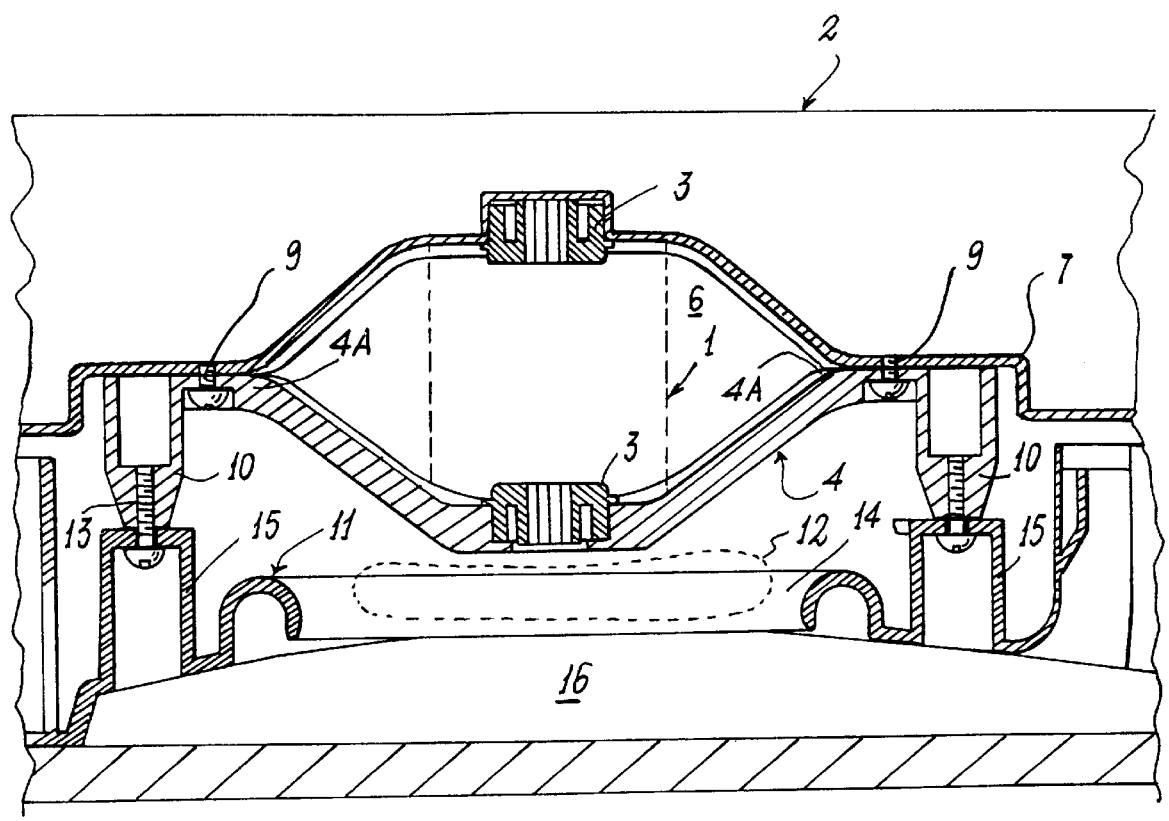
FIG. 4 is a more constructional view, in a section similar to that of FIG. 2, of a more advantageous embodiment of the invention.

FIG. 4 shows an improved embodiment of the present invention. In the description of this embodiment the same reference numerals are used to indicate parts identical with or corresponding to those of the preceding embodiment.

As can be seen from FIG. 4, the cavity 6 is of slightly different shape (more extended at the sides) from that already described, and the feet 4A of the bracket comprise parallel projections 10 facing the interior of the refrigerator cabinet and to which a volute casing 11 for the air moved by the conventional impeller 12 driven by the fan motor 1 is fixed by self-tapping screws 13.

The volute casing 11 is positioned with its delivery port 14 in correspondence with the impeller 12, and for its fixing comprises hollow projections 15 which abut against the projections 10 provided on the bracket 4. The reference numeral 16 indicates part of the air delivery ducting.

We claim:

1. A mounting arrangement for a fan motor having opposite ends and a first damper element extending from one end of the fan motor and a second damper element extending from the opposite end of the fan motor, said motor of the type found in a forced-air circulation refrigerator having a liner forming an inner wall of the refrigerator, the mounting arrangement comprising:

a bracket having a seat for the first damper element, and a cavity adapted to be formed in the liner for defining a seat for the second damper element, wherein the bracket is adapted to be attached to the liner of the refrigerator substantially enclosing and capturing the fan motor between the bracket and the liner.

2. The mounting arrangement as claimed in claim 1, wherein:

the bracket is an elongated member having opposite ends the ends having frontal projections adapted for mounting an air volute casing for a motor of the type having a drivingly mounted fan blade.

3. The mounting arrangement according to claim 1, wherein the bracket is a molded, plastic member.

4. A support system for a fan motor of the type having opposite ends and a first damper element extending from one end of the fan motor and a second damper element extending from the opposite end of the fan motor and of the type found in a forced-air circulation refrigerator having a liner forming an inner wall of the refrigerator, the support system consisting of:

a bracket adapted to be fixedly attached to the liner of the refrigerator, the bracket having a seat for the first damper element, and a cavity adapted to be formed in the liner for defining a seat for the second damper element, wherein the two seats substantially capture the fan motor between the bracket and the liner.

* * * * *